Jan. 8, 1924. 1,480,022
H. E. SNODGRASS
ELECTRIC WELDING APPARATUS
Filed May 6, 1920   3 Sheets-Sheet 3
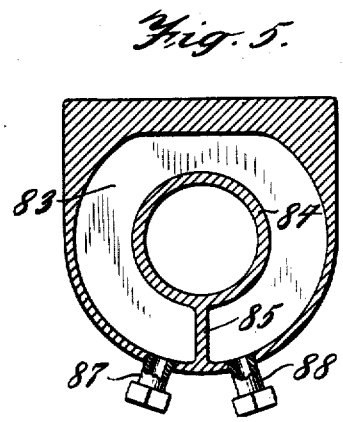
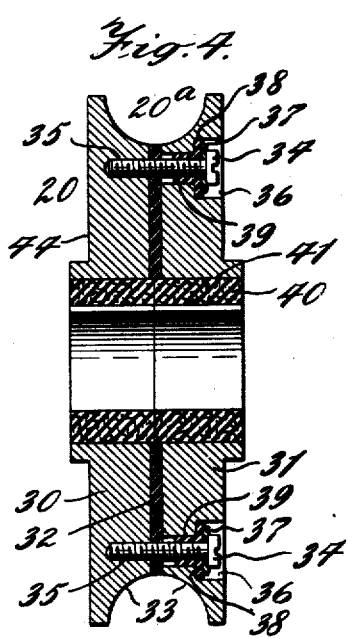
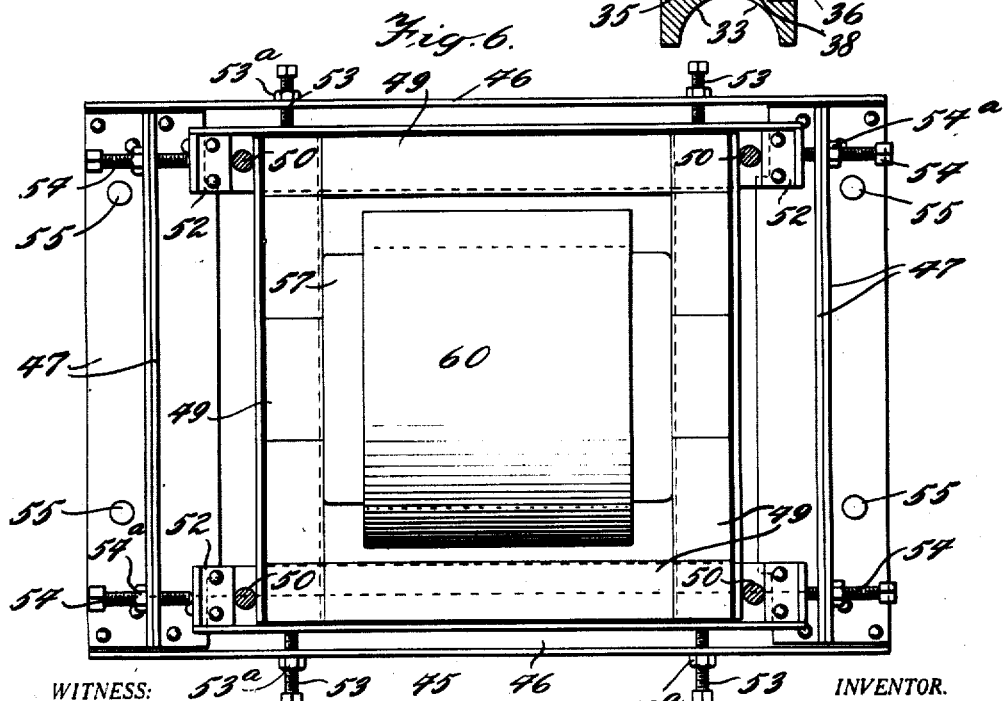

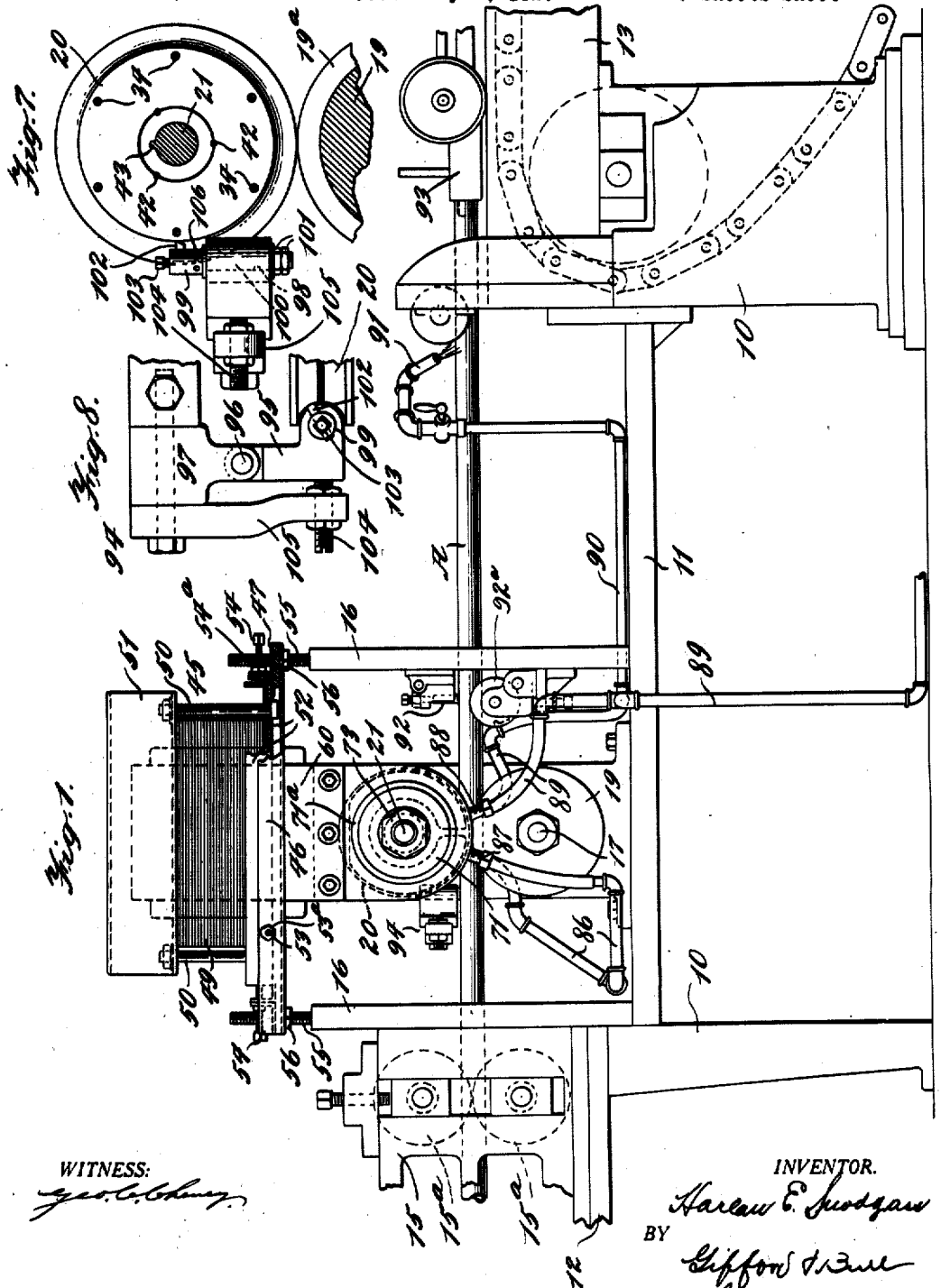

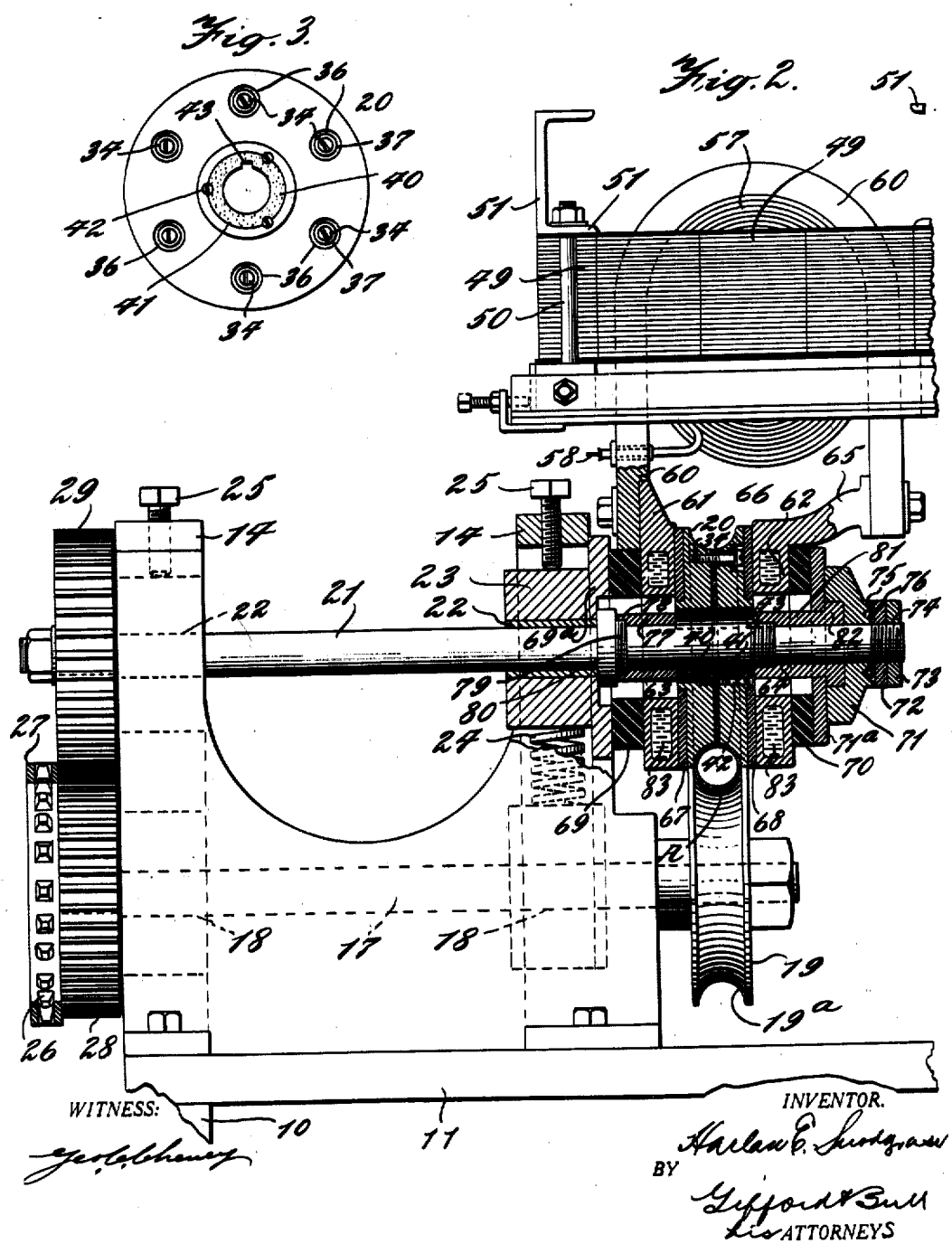

Patented Jan. 8, 1924.

1,480,022

UNITED STATES PATENT OFFICE.

HARLAN E. SNODGRASS, OF SUMMIT, NEW JERSEY, ASSIGNOR TO NEWARK TUBE COMPANY, OF NEWARK, NEW JERSEY, A CORPORATION OF NEW JERSEY.

ELECTRIC WELDING APPARATUS.

Application filed May 6, 1920. Serial No. 379,206.

*To all whom it may concern:*

Be it known that I, HARLAN E. SNODGRASS, a citizen of the United States, residing at Summit, in the county of Union and State of New Jersey, have invented certain new and useful Improvements in Electric Welding Apparatus, of which the following is a specification.

In accordance with my invention, two abutting metallic edges are welded together by current that is caused to pass from one abutting edge to the other, and while not limited thereto, my invention is particularly applicable to the welding of seamed tubing.

One of the features of my invention is the provision of a welding apparatus of the character indicated, comprising two contact pieces engaging on opposite sides of the gap or seam between two abutting metallic edges, and a transformer comprising a secondary independent of the frame of the apparatus and having pole pieces disposed adjacent to the two contact pieces and electrically connected thereto, the secondary thus forming a short path for the secondary with minimum losses therein.

Another feature of my invention is the provision of a welding apparatus of the character indicated, comprising a unitary welding roll provided with two insulated contact discs to which current from the secondary of the transformer is supplied.

Another feature of my invention is the provision of means for cooling the pole pieces through which the current passes.

Another feature of my invention is the provision of a transformer having a secondary loop formed of solid material and electrically connected to the welding contact pieces.

Another feature of my invention is the provision of friction members located between the pole pieces of the secondary of the transformer and the welding contact pieces to form a convenient electric connection between the pole pieces and the welding pieces.

Still another feature of my invention is the provision of means for dressing the unitary welding roll, and a transformer universally adjustable in position.

Still another feature of my invention is so constructing the transformer that its secondary forms an annular connection with the side of the welding roll by extending around (and preferably all the way around) the shaft.

Other features of my invention will appear in the specification and will be particularly pointed out in the claims.

My invention will best be understood by reference to the accompanying drawings, in which I have illustrated one embodiment of my invention, and in which Figure 1 is a side view of a welding apparatus embodying my invention; Fig. 2 is an end elevation, partially in section, as viewed from the left of Fig. 1; Fig. 3 is a transverse sectional elevation showing the unitary welding roll; Fig. 4 is a sectional view taken along the axis of welding roll; Fig. 5 is is a section through one of the pole pieces of the secondary of the transformer; Fig. 6 is a plan view of the transformer and associated parts; Fig. 7 is a side elevation illustrating the position of the dressing tool with respect to the welding roll, and Fig. 8 is a plan view of the dressing tool and the associated means for adjusting the same.

Like reference characters indicate like parts throughout the drawings.

Referring, now, to the drawings, 10 are the leg supports of the apparatus provided with bed-plates 11 and 12 on which the working parts of the apparatus are mounted, and 13 indicates a frame for the pulling device and for supporting the finished tubing after leaving the welding apparatus proper. Standards 14 (see Fig. 2) are mounted on the bed-plate 11 and standards 15 are mounted on the bed-plate 12, within which are mounted the rolls 15ª mounted in front of the welding rolls and for guiding the tubing thereto. Standards 16 support the transformer and associated parts.

A shaft 17 has its bearings at 18 in suitable blocks mounted within the standards 14. A roll 19, grooved at 19ª, is mounted on the shaft 17 and cooperates with a welding roll 20 secured on a shaft 21 having its bearings at 22 in blocks 23 which are vertically adjustable for the purpose of maintaining the welding roll correctly positioned with respect to the lower roll 19. The bearing blocks 23 are pressed upwardly by springs 24, only one of which is shown in Fig. 2, the upward movement of the blocks 23 being limited by screws 25 passing through the top part of the standards 14 and by which the vertical position of the bearing blocks, and accordingly the shaft 21, may be adjusted. The shaft 17 is driven by any suitable means, which is illustrated as a sprocket 26 engaged by a sprocket chain 27 connected to a suitable source of power. A gear 28 is secured on the shaft 17 and engages a gear 29 on the shaft 21.

Referring, now, more particularly to Figs. 3 and 4, the unitary welding roll 20 comprises two contact pieces 30 and 31 in the form of annular discs which are separated from each other by an insulating member 32. Each of the discs 30 is provided with an annular recess 33 segmental in cross section, as shown in Fig. 4, and which, with the insulating member 32, forms a semi-circular groove 20ª, which, with the groove 19ª in the lower roll 19, forms a cylindrical opening for the reception of the tubing A. The two contact discs 30 and 31 are secured together by screws 34 engaging tapped openings 35 in the disc 30, the heads of the screws being received in recesses 36 in the disc 31 and the heads of the screws preferably engaging insulating washers 37, in turn, engaging insulating collars 38, angular in cross section, as shown in Fig. 4, the outwardly extending flanges of which rest in the bottom of the recesses 36, and the cylindrical portions 39 of which form sleeves positioned between the screws 34 and the wall of the opening in the disc 31 surrounding the screw.

The welding roll 20 is secured to the shaft 21 by a sleeve 40 of insulating material which fits within a central opening 41 of the roll 20, and may be secured thereto by screws 42 received in the openings between the sleeve and the wall of the opening 41. The sleeve 40 is keyed to the shaft 21, as at 43. Each of the discs 30 and 31 is provided on its outer face with an annular recess 44 for a purpose that will later appear.

I will now describe the transformer and associated parts. I have indicated at 45 a frame for supporting the transformer, the frame comprising angle-irons 46 extending along the sides of the transformer, as indicated in Fig. 6, and end angle-irons 47, two such end angle-irons preferably being placed back to back at each end, with the vertical flanges against each other and riveted or otherwise secured to the angle-irons 46. The transformer is preferably located above the work, as indicated. The transformer comprises a laminated core 49, the sheets of which are bound together by clamping bolts 50 which engage clamping irons 51 above the transformer and angle-irons 52 below the transformer, the latter slidably engaging the frame 45. The transformer is adjusted in any direction horizontally by screws 53 passing through the vertical flanges of the angle-irons 46 and engaging the clamping irons of the transformer, and by screws 54, passing through the flanges of the angle-irons 47, also engaging the clamping irons of the transformer, the screws being secured in position by lock nuts 53ª and 54ª, respectively. It will be apparent that the position of the transformer may be adjusted in any direction horizontally by properly adjusting the screws.

In accordance with my invention, provision is also made for adjusting the transformer vertically. In the form here illustrated, the frame 45 engages screw-threaded extensions 55 of the standards 16, the frame resting upon nuts 56 immediately beneath the frame, so that by adjusting the position of the nuts, the vertical position of the transformer may be adjusted.

Current is supplied to the primary 57 of the transformer by supply conductors 58 connected to any suitable source of electrical supply. The secondary of the transformer, which is preferably formed by a single loop of solid material, preferably comprises a U-shaped member 60, as indicated in Fig. 2, comprising pole pieces 61 and 62, which are provided with central openings 63 and 64 through which the shaft 21 passes, the pole piece 61 being clamped to the body of the U-shaped member 60 by bolts and nuts, as shown, while the pole piece 62 is preferably provided with an offset portion 65, which is similarly clamped to the U-shaped member 60. Metal washers 67 and 68 are received within the recesses 44 of the two welding members 30 and 31 of the unitary contact roll and form a frictional engagement between the pole pieces 61 and 62 of the two welding pieces 30 and 31. The metal washers 67 and 68 are preferably formed of a metal which is harder than that of either the pole pieces or the unitary roll, in order to reduce the friction so far as possible. By making the secondary solid, as by casting, serious losses, which would result with a laminated secondary, are obviated. Furthermore, making the secondary of the transformer independent of the apparatus and the provision of the unitary welding roll comprising the two welding members insulated from each other, permits the use of a transformer having a secondary of the described character, having a minimum length and in which the losses are reduced to a minimum.

In accordance with my invention, means are also provided for maintaining a substantially constant pressure between the pole pieces, the washers and the discs of the unitary roll. For this purpose, resilient washers 69 and 70 are placed against the outer faces of the pole pieces 61 and 62, and a clamping head 71 is adjustably secured on the outer end of the shaft 21, a metal washer 71ª preferably being interposed between the head and the washer 70, and a metal washer 69ª being interposed between the rubber washer 69 and the standard 14. The head 71 is secured in position against the washer 71ª by a nut 72 and a locking nut 73 engaging the screw-threaded end 74 of the shaft 21. A ball-bearing is preferably provided between the nut 72 and the outer face of the head 71, the head 71 being provided with a race 75 in which are placed balls 76. By the described means, the pressure against the friction discs may be adjusted, and this pressure is maintained substantially constant by the resilient washers 69 and 70, which compensate for any slight variation resulting from the wear of the parts.

Provision is also made for adjusting the welding roll 20 longitudinally of the shaft 21. For this purpose a sleeve 77 surrounding the shaft 21 engages the insulating sleeve 40, as shown. The outer end of the sleeve 77 is counter-bored, as at 78, and provided with screw threads which engage the screw threads 79 formed on a hub on the shaft 21 adjacent the collar 80. A flanged sleeve 81 surrounding the shaft 21 engages the insulating sleeve 40 within the welding roll 20 on the opposite side thereof from the sleeve 77, and the outer flanged end of the sleeve 81 is received in a recess in the head 71. Because of the screw-thread engagement of the sleeve 77 with the screw threads 79, the same may be adjusted longitudinally of the shaft, and the welding roll 20 may be given a corresponding adjustment.

In the operation of a welding apparatus of the described character, a large amount of heat is necessarily developed at the welding roll and at the friction discs 67 and 68, and in accordance with my invention, provision is made for cooling the pole pieces and thereby keeping the temperature within safe limits. The pole pieces are chambered at 83, as best shown in Fig. 5, and a partition or septum 85 is formed therein, as indicated. Water is supplied to the chambers 83 of the pole pieces by inlet pipes 86 (only one of which is shown in Fig. 1) which are nippled to the pole pieces, as at 87, outlet nipples 88 being connected to the outlet pipe 89. A pipe 90 is also preferably provided, connected to the pipe 89 and having a nozzle 91 located above the tubing A as it leaves the welding apparatus, for the purpose of cooling the same. It will be understood that the water entering the chamber 83 is forced around through the chamber in contact with the walls thereof.

A tool 92 (see Fig. 1) is preferably provided for smoothing the welded part of the tubing as it leaves the welding apparatus.

A clamp 93, as shown in Fig. 1, engages the end of the tubing and drags the tubing through the welding apparatus. This clamping arrangement constitutes no part of my invention and the same need not be described in detail.

I have shown in Figs. 7 and 8, at 94 in general, a device for dressing the welding roll. It will be understood that after the welding operation has continued for some time, the groove in the welding roll becomes more or less roughened, and it is desirable to dress the roll in order to maintain a satisfactory working surface between the welding roll and the tubing. An arm 95 is pivoted at 96 to a stationary bracket 97. The arm is provided with a vertical opening 98, which is preferably cylindrical in form, within which is received a bar or member 99 provided with a contracted portion 100, which is received within the opening 98 and which is secured in position by a nut or nuts 101 engaging the lower end thereof. A dressing tool 102 is mounted in the member 99 and is secured in position by a set-screw 103. The position of the arm 95 is adjusted toward the welding roll by means of a screw 104 passing through a stationary bracket 105 and engaging the arm 95. The bar or member 99 is provided with openings 106 for the reception of a pin or handle by which the same may be rotated. In order to dress the welding roll, the tool is moved into engagement with the welding roll by means of the adjusting screw 104, and then by rotating the welding roll 20 and gradually rotating the bar 99, the groove in the welding roll is dressed, it being understood that the center of the member 99 coincides with the center of the groove at the point where the tool is located. The cylindrical part of the roll may be dressed by a hand-held tool.

The adjustment of the transformer is especially advantageous where the diameter of the welding roll is varied, because of the dressing operation, in the manner described, as the welding roll may be kept properly positioned with respect to the lower roll, and the proper pressure between the welding roll and the tubing maintained. This feature is of importance, as satisfactory welding is dependent on a proper pressure between the welding roll and the tubing.

The operation of the device embodying my invention will readily be understood from the foregoing description. The seamed tubing A is fed between the guide rolls 15ª to the welding rolls, provision being made for causing the seam of the tubing to come directly beneath the insulating member 32 of the welding roll, so that the two sides of the tube opposite the seam are brought into engagement with the respective contact discs 30 and 31 and the current passing between the butt edges of the tubing adjacent the seam heats the tubing sufficiently to weld the same. After passing from the welding rolls, the tubing is engaged by the roll 92ª, and the tool 92 scrapes or dresses the welded part of the tubing so that it presents a finished appearance.

Although I have shown various features of my invention, which are set forth at the beginning of this specification and in the claims, in forms which are practicable, I do not wish to limit myself to these forms, since I am aware that the ideas embodied therein are susceptible of embodiment in a variety of forms without departing from the principle of my invention.

What I claim and desire to secure by Letters Patent of the United States is:

1. In an apparatus for welding two metallic abutting edges, a unitary welding roll comprising two welding members insulated from each other and secured together, and a transformer whose secondary includes stationary pole pieces having annular surfaces adjacent to and facing the sides of said welding roll.

2. In an apparatus for welding two metallic abutting edges, a unitary welding roll comprising two welding members insulated from each other and secured together, the welding roll being formed with a groove for the reception of tubing to be welded, and a transformer having a secondary including stationary pole pieces having annular surfaces adjacent to and facing the sides of said welding roll.

3. In an apparatus for welding two metallic abutting edges, a unitary welding roll comprising two welding members insulated from each other and secured together, a transformer comprising a secondary including a loop formed of solid metal and provided with stationary pole pieces having annular surfaces adjacent to and facing the sides of said welding roll.

4. In an apparatus for welding two metallic abutting edges, welding members for engaging the metal on opposite sides of the seam, a transformer comprising a secondary formed with pole pieces, said pole pieces being provided with chambers, and connections for passing a cooling fluid through said chambers.

5. In an apparatus for welding two metallic abutting edges, two welding members for engaging the metal on opposite sides of the seam, a transformer comprising a secondary loop formed with pole pieces disposed adjacent to said welding members, said pole pieces being formed with chambers, and connections for circulating a cooling fluid through said chambers.

6. In an apparatus for welding two metallic abutting edges, a welding roll comprising two welding members for engaging the metal on opposite sides of the seam, a transformer comprising a secondary loop formed with pole pieces disposed adjacent to said welding members, friction members disposed between said pole pieces and said welding members, said pole pieces being formed with chambers, and means for passing a cooling fluid through said chambers.

7. In an apparatus for welding two metallic abutting edges, a welding roll comprising two welding members for engaging the metal on opposite sides of the seam, a transformer comprising a secondary loop formed of solid material and having pole pieces disposed adjacent to said welding members, friction members disposed between said pole pieces and said welding members, said pole pieces being formed with chambers, and means for passing a cooling fluid through said chambers.

8. In a tube welding apparatus, a welding roll comprising two welding members for engaging the tubing on opposite sides of the seam, said roll being provided with a groove for receiving the tubing, a transformer having a secondary including pole pieces disposed adjacent to the respective welding members and electrically connected thereto, and means for dressing the roll, and means for adjusting said roll and said transformer vertically.

9. In an apparatus for welding two metallic abutting edges, a welding roll comprising two welding members for engaging the metal on opposite sides of the seam, a transformer having a secondary including pole pieces disposed adjacent to the respective welding members and electrically connected thereto, and means for adjusting the position of said transformer in any direction to position the pole pieces properly with respect to said welding roll.

10. In an apparatus for welding two metallic abutting edges, in combination, the rotary welding members, and a transformer the secondary of which is provided with annular pole pieces forming an annular electrical connection with one of said welding members.

11. In an apparatus for welding two metallic abutting edges, in combination, a rotary welding apparatus, and a transformer the secondary of which is provided with annular pole pieces forming a sliding annular electrical connection with one of said welding members.

12. In an apparatus for welding two metallic abutting edges, in combination, the rotary welding members, and a transformer the secondary of which is provided with annular pole pieces extending around the axis of rotation of one of said welding members.

13. In an apparatus for welding two metallic abutting edges, in combination, the rotary welding members, a shaft for said members, and a transformer the secondary of which is provided with annular pole pieces extending around said shaft.

14. In an apparatus for welding two metallic abutting edges, in combination, the rotary welding members, and a transformer the secondary of which extends around the axis of rotation of said welding members and forms electrical connections respectively with the opposite sides thereof.

15. In an apparatus for welding two metallic abutting edges, in combination, the rotary welding members, and a transformer the secondary of which is provided with annular pole pieces forming a circular connection respectively with each of said welding members substantially concentric with the axis of rotation.

16. In an apparatus for welding two metallic abutting edges, in combination, a two-part welding wheel, the insulation for said two parts, and a transformer the secondary of which is provided with annular pole pieces forming an electrical connection with each of said parts.

HARLAN E. SNODGRASS.